(12) United States Patent
Prober

(10) Patent No.: US 10,047,790 B2
(45) Date of Patent: Aug. 14, 2018

(54) SIDE LOAD BEARING ASSEMBLY

(71) Applicant: Paul R. Prober, Santa Fe, NM (US)

(72) Inventor: Paul R. Prober, Santa Fe, NM (US)

(*) Notice: Subject to any disclaimer, the term of this patent is extended or adjusted under 35 U.S.C. 154(b) by 7 days.

(21) Appl. No.: 15/274,342

(22) Filed: Sep. 23, 2016

(65) Prior Publication Data

US 2018/0087570 A1 Mar. 29, 2018

(51) Int. Cl.
F16C 19/49 (2006.01)

(52) U.S. Cl.
CPC .......... *F16C 19/49* (2013.01); *F16C 2361/55* (2013.01)

(58) Field of Classification Search
CPC ...... F16C 19/49; F16C 33/37; F16C 33/3706; F16C 33/3713; F16C 33/372; F16C 33/374; F16C 2361/55; F16C 2300/14; F16F 15/1208; F16F 15/13171; F16F 15/3156
USPC ....................................... 74/573.13
See application file for complete search history.

(56) References Cited

U.S. PATENT DOCUMENTS

| | | | | |
|---|---|---|---|---|
| 2,523,238 A | * | 9/1950 | Tarbutton | F16C 19/163 384/495 |
| 3,124,396 A | * | 3/1964 | Barager | F16C 19/20 384/522 |
| 3,455,618 A | * | 7/1969 | Wehner | F16C 19/10 384/615 |
| 4,795,279 A | * | 1/1989 | Smith | F16C 19/20 384/450 |
| 8,978,513 B2 | | 3/2015 | Prober | |
| 2014/0260779 A1 | | 9/2014 | Prober | |

FOREIGN PATENT DOCUMENTS

| | | |
|---|---|---|
| CN | 205036722 U | 2/2016 |
| RU | 2334137 C2 | 9/2008 |
| RU | 2008104882 A | 8/2009 |
| RU | 2384766 C2 | 3/2010 |
| RU | 2391572 C2 | 6/2010 |
| SU | 746135 A | 7/1980 |
| UA | 76174 U | 12/2012 |
| WO | 2014163599 A1 | 10/2014 |

OTHER PUBLICATIONS

International search Report for PCT/US2017/053232 dated Dec. 21, 2017.

* cited by examiner

*Primary Examiner* — James Pilkington
(74) *Attorney, Agent, or Firm* — Roberts Mlotkowski Safran Cole & Calderon P.C.

(57) ABSTRACT

A low-friction side load bearing assembly for accommodating severe side loads applied to a spindle is provided. The side load bearing assembly includes a sleeve member having a frustro-conical outer surface that is slidably mounted on the spindle, and a cageless rolling bearing circumscribing the sleeve member. The cageless rolling bearing includes an annular housing that contains an inner ring of ball bearings that engages the sleeve member, and an outer ring of rolling bearings that maintains angular spacing between the ball bearings of the inner ring. A spring-loaded biasing mechanism pushes the sleeve member along the axis of rotation of the spindle such that its frustroconical outer surface wedgingly engages the inner ring of ball bearings thereby obviating the need for a bearing cage and rendering the bearing assembly self-adjusting for wear.

21 Claims, 6 Drawing Sheets

SIDE LOAD BEARING ASSEMBLY

FIELD

This invention generally relates to friction-reducing bearings, and is particularly concerned with a low-friction cageless bearing assembly capable of handling severe side loading.

BACKGROUND

Interest in flywheels as energy storage devices has increased recently as a result of the movement toward "green" energy produced from windmills, as such flywheels could be used in a windmill-based electrical power station to store energy produced when ambient winds are high and provide power output during periods when ambient winds are low. Such flywheels may also be used in solar-based electrical power stations to provide power output after sunset.

Flywheel energy storage has a number of advantages that make it an attractive design option. Compared with other ways to store electricity, flywheel energy storage systems have long lifetimes, lasting decades with little or no maintenance. Full-cycle lifetimes quoted for flywheels range from between $10^5$ and $10^7$ start-stop cycles of use. Such systems also have a potentially high energy density (100-130 W·h/kg, or 360-500 kJ/kg), in addition to large maximum power output. The energy efficiency (ratio of energy out per energy in) of flywheels can be as high as 90%. Typical capacities range from 3 kWh to 133 kWh. Rapid charging or discharging of a flywheel system can occur in less than 15 minutes.

The energy of a rotating disc may be computed according the following formula:

$$E_k = \tfrac{1}{4}\omega^2 M R^2$$

In the above formula, $E_k$ equals energy, $\omega$=radians per second, M=mass of the flywheel, and R=the radius of the flywheel. Because the energy storage capacity of a disc-shaped flywheel increases with the square of its rotational speed, most energy-storing flywheel systems are designed to operate at very high rotational speeds (e.g. 10,000-60,000 rpms or more). But while high speed rotation exponentially increases the energy storage capacity of the system, it also results in a number of disadvantages. High speed flywheels must be precision-constructed of high tensile strength material to maintain balance and structural integrity during operation. To cope with the frictional losses associated with such high speeds, precision bearings are necessary. In some systems, conventional ball or roller bearings are used wherein the ball or roller bearings are caged within concentric races. To reduce friction to acceptable levels and to insure longevity, the cages, races and balls or rollers of such mechanical bearings must be machined to exacting tolerances. To further reduce friction, some flywheel energy storage systems use pressurized air or repulsive magnet bearings. However, such levitating-type bearings substantially increase the costs associated with such systems and impose practical limitations on the weight of the flywheel. For flywheels rotated at speeds high enough to exceed the sound barrier around their periphery, it is desirable to at least partially evacuate the interior of the housing to eliminate the resulting turbulent air drag losses, and the wear around the outer edge of the flywheel due to air friction. All of these requirements increase the overall cost of the system.

To avoid such problems, high-mass flywheel systems rotating at moderate, sub-sonic speeds have been developed, an example of which is disclosed in U.S. Pat. No. 8,978,513. In this particular design, a high-mass flywheel is mounted on the lower end of a vertically-oriented spindle. A novel thrust bearing mounted at the lower end of the spindle bears the heavy load applied by the high-mass flywheel while minimizing energy-leaching friction. By contrast, only a relatively light-duty annular sleeve-type bearing is used at the upper end of the spindle in order to keep the flywheel and spindle balanced along a vertical axis.

SUMMARY

While such annular sleeve-type bearings are fully capable of handling the side loading that the upper end of a vertically-oriented flywheel spindle may experience during normal operation, the applicant has observed several shortcomings associated with such a bearing design. For example, a high-mass, subsonic flywheel my weigh on the order of 20 tons, have a radius of about 7 feet, and rotate at a speed of about 3000 rpms. Hence, even under normal operating circumstances, the top spindle bearing is subjected to considerable side loading regardless of how well-balanced the flywheel assembly is initially constructed. Such side loading causes wear in the bearing, which in turn causes imbalances in the flywheel that accelerate the wear of the bearing, The resulting negative feedback wear cycle necessitates periodic adjustments of the top bearing to keep the flywheel balanced.

Moreover, there are abnormal operating circumstances that are likely to occur over the lifetime of the flywheel assembly that could result in the catastrophic failure of a conventional upper spindle bearing. For example, if such a high-mass, 20 ton flywheel operating at 3000 rpms is subjected to an earthquake or an earth tremor, the inertia of the flywheel, coupled with the gyroscopic forces generated by its rotation, will subject the upper spindle bearing to severe side loading as the structure supporting the upper spindle bearing jerks side-to-side against the spindle in response to the often violent vibrations caused by earthquakes. Alternatively, if a portion of the high-mass flywheel should break off during operation, the radial vibrations caused by the rotational imbalance could also subject the upper bearing to severe side loading. In either case, a conventional annular sleeve-type bearing or even a conventional caged ball bearing could fail under such circumstances and contribute to a catastrophic failure of the flywheel assembly.

To better appreciate the scale of such a catastrophic failure, consider the forces that might be applied to a side load bearing used in a commercially-sized flywheel assembly wherein the flywheel has a diameter of let us assume flywheel that is 7 feet in diameter, 3 feet thick and having a mass of a little over 23 tons. To avoid breaking the sound barrier, let us further assume that the flywheel is rotated at a speed of 3000 rpms (or 50 rotations per second). At such a rotational speed, the outer edge of the rim of the flywheel would be moving at a linear speed of 1100 ft. per second, which is just under the sea level supersonic limit of 1126 ft. per second. Applying the previously mentioned formula $E_k = \tfrac{1}{4}\omega^2 M R^2$ the flywheel in this example would be storing 5,291 kilowatt hours of energy. Thus the amount of energy released in the event that a bearing failure that caused the flywheel to come to a complete stop after a few seconds would be enormous, as would be the consequent side loading forces.

The side load bearing of the invention overcomes or at least ameliorates all of the aforementioned shortcomings. To these ends, the side load bearing assembly of the invention generally comprises a sleeve member mounted on a spindle and having a frustro-conical outer surface, and a cageless rolling bearing circumscribing the sleeve member. The cageless rolling bearing includes an annular housing that contains an inner ring of rolling bearings that engages the sleeve member, and an outer ring of rolling bearings that maintains angular spacing between the rolling bearings of the inner ring. Preferably, the cageless rolling bearing is a planetary bearing including an outer ring of rolling bearings that engages a load-bearing annular wall of the housing, and an inner ring of rolling bearings, each of which engages two of the outer ring bearings on one side, and the frustroconical outer surface of the sleeve member on another side. The frustroconical outer surface wedgingly engages the inner ring of rolling bearings, thereby radially pushing each of the inner ring of rolling bearings between two of the outer ring of rolling bearings into engagement with the outer ring of rolling bearings. The combination of a dual-ring arrangement of rolling bearings with a frustroconical sleeve that applies a radially-directed force on the inner ring of rolling bearings obviates the need for a cage to maintain uniform spacing between the bearings during operation. Additionally, the three-point contact between each of the inner ring rolling bearings with the sleeve on one side and two of the outer ring rolling bearings on the other side more evenly distributes compressive forces on the rolling bearings during episodes of severe side loading, thereby reducing the chance of bearing failure.

The sleeve member may be journaled on the spindle so that it is both rotatable and axially moveable thereon, and the bearing assembly my further comprise a biasing mechanism that includes a compression spring for biasing the sleeve member along the axis of rotation of the spindle such that the frustroconical outer surface wedgingly engages the inner ring of rolling bearings. Such an arrangement automatically accommodates for wear during the operation of the bearing since the biasing mechanism will simply slide the frustroconical sleeve along the axis of the spindle as small amounts of material are worn off of the sleeve and/or rolling bearings. This in turn obviates the need for bearing adjustments over the life of the bearing.

A biasing mechanism is provided for biasing the sleeve member along the axis of rotation of the spindle such that the frustroconical outer surface wedgingly engages the inner ring of rolling bearings at a same pressure regardless of wear or deformation of the frustroconical outer surface of the sleeve member. The biasing mechanism may include a resilient spring member compressed between the sleeve member at one end and a retainer connected to the spindle at an opposite end. The biasing mechanism preferably includes a clutch that frictionally transmits torque from the spindle to the sleeve member via the resilient spring member. The clutch may include one or more friction members, such as bronze washers or discs, that are disposed between the ends of the resilient spring member and one or the other or both of the sleeve member and the retainer. During normal operation, torque from the spindle is frictionally transmitted to the sleeve via the friction members such that the sleeve rotates in unison with the spindle. However, during abnormal operation caused e.g. by an earthquake wherein severe side loading causes the sleeve member to momentarily bind against the planetary bearing, the clutch breaks the connection between the spindle and the sleeve so that the spindle may freely rotate with the rotating flywheel's mass within the bore of the sleeve member.

The cageless rolling bearing is preferably stationarily mounted around the frustro-conical sleeve member. The housing of the bearing assembly preferably includes a recessed, annular bottom wall disposed orthogonally to the annular load-bearing wall for supporting the outer and inner rings of rolling bearings. The rolling bearings of the inner ring may be ball bearings, while the rolling bearings of the outer ring may be cylindrical roller bearings. Both the inner ring and outer ring bearings are preferably made of hardened steel.

The cylindrical roller bearings of the outer ring may be arcuately recessed around their axes of rotation to give them a somewhat hour-glass shaped profile. The arcuate recess is complementary to the shape of the ball bearings to provide line contact between the cylindrical roller bearings of the outer ring and the ball bearings of the inner ring. Additionally, the diameter of the ball bearings and the arcuate recess of the roller bearings may be configured such that a bottom surface of each of the roller bearings is lifted out of contact with the recessed annular bottom wall of the housing of the cageless planetary bearing when the ball bearings forcefully engage the roller bearings. The bottom ends of the cylindrical roller bearings may have a partial-spherical profile to provide only point contact between the recessed annular bottom wall of the housing to further reduce friction in case of contact.

While the inventive side load bearing is particularly adapted for use as an upper spindle bearing in a flywheel assembly where a high-mass flywheel is mounted to the lower end of the spindle, the side load bearing may be advantageously applied in any context where a spindle or other rotating body is subjected to substantial loads that are orthogonal to the axis of rotation of the spindle or other rotating body.

BRIEF DESCRIPTION OF THE DRAWINGS

FIGS. 4B and 4C are plan views along lines 4B-4B and 4C-4C of FIG. 4A of the retainer and the top surface of the sleeve member that the spring and clutch rings of the biasing mechanism are disposed between;

DETAILED DESCRIPTION OF THE PREFERRED EMBODIMENT

Figure 1A:
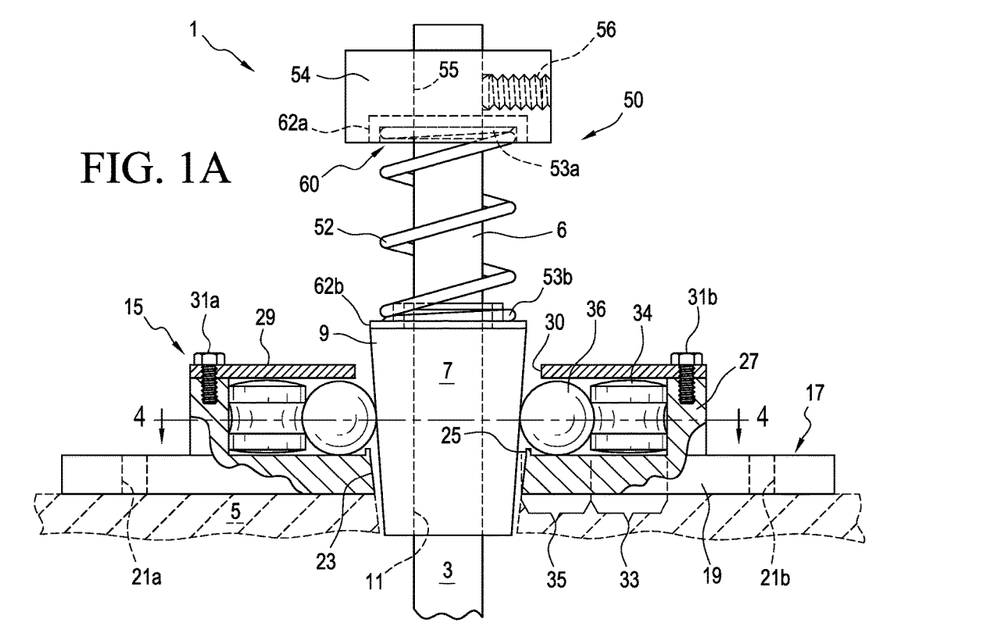
FIG. 1A is a side, partial cross-sectional view of one embodiment of the side load bearing assembly of the invention.
Figure 1B:
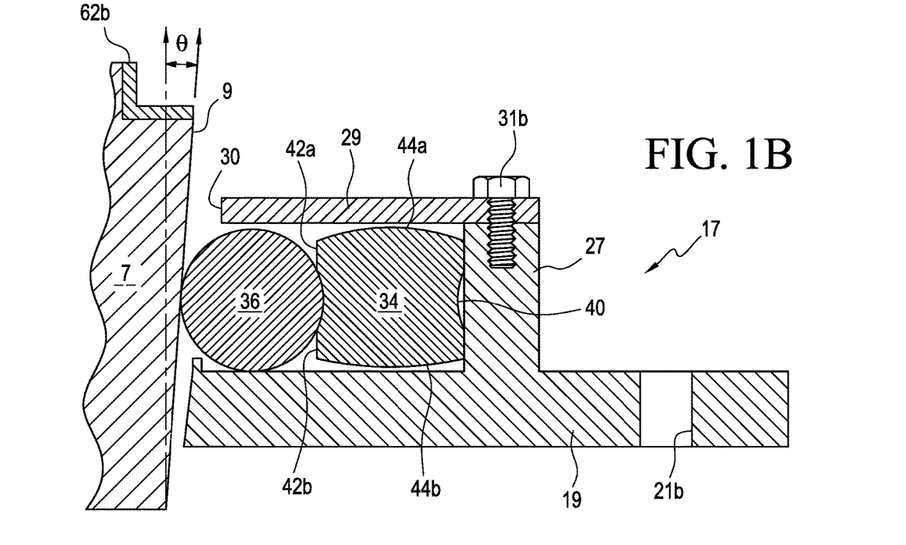
FIG. 1B is an enlarged, partial side-cross sectional view of the side load bearing assembly of FIG. 1A, illustrating in particular the engagement between the inner ring of ball bearings and the outer ring of roller bearings of the cageless rolling bearing.

With reference now to FIGS. 1A and 1B, the side load bearing assembly 1 of the invention rotatably mounts a vertically-oriented, rod-shaped spindle 3 preferably formed from steel to a stationary housing 5 of, for example, an energy-storing flywheel assembly. To this end, the side load bearing assembly 1 generally comprises a cork-shaped sleeve member 7 rotatably and slidably mounted on the spindle 3, cageless rolling bearing 15 circumscribing the sleeve member 7, and a biasing mechanism 60 that spring-loads the sleeve member into engagement with the rolling bearings of the cageless rolling bearing 15.

The sleeve member 7 is preferably formed from steel, and has a frustroconical outer surface 9 on its exterior. For reasons given hereinafter, the angle of the taper θ of the frustroconical surface 9 S9 shown in FIG. 1B) preferably ranges between 5° and 15°. The sleeve member 7 further includes a cylindrical bore 11 concentrically aligned with its axis of rotation. The inner diameter of the cylindrical bore 11 is closely machined to the outer diameter of the rod-shaped spindle 3 so that the sleeve 7 is capable of both smoothly rotating around the spindle 3 and axially sliding along the spindle 3 with a minimum amount of play, even though during normal operation the only relative movement between these components is a small amount of axial sliding of the sleeve 7 along the spindle 3. To this end, a film of lubricant is provided between the sleeve and spindle 3. Alternatively, a cylindrical bronze shell (not shown) may be installed around the inner surface of the cylindrical bore 11 to provide lubrication between the steel surfaces of the sleeve 7 and spindle 3.

The cageless rolling bearing 15 may be a planetary bearing as illustrated. The cageless rolling bearing 15 includes a housing 17 having a circular base plate 19. Base plate 19 includes bolt holes (of which only holes 21a and 21b are shown) for securing the bearing housing 17 to the housing 5 through which the vertically-oriented spindle 3 extends. A centrally-disposed opening 23 is concentrically provided in the circular base plate 19 for admitting both the spindle 3 and the sleeve 7. An annular wall 27 extends upwardly from the circular base plate. Annular wall 27 is preferably integrally formed with and concentrically arranged around the circular base plate 19 in order to accommodate potentially large radially-oriented forces. A circular bearing cover 29 is secured over the top edge of the annular wall 27 via retaining bolts, of which only bolts 31a and 31b are shown. Like base plate 19, circular bearing cover 29 includes a concentrically-arranged opening 30 for accommodating the upper end of the sleeve 7 and the spindle 3. While FIG. 1A indicates that the cover 29 is a single circular plate, it is more preferably formed from four overlapping C-shaped sections. Because such a structure is easier to assemble or disassemble around the sleeve 7, it facilitates the application of lubricants, replacement of rolling bearings, and any other maintenance procedures associated with the planetary bearing 15. Moreover, the use of four overlapping C-shaped sections (as opposed to simply two abutting C-shaped sections) retains much of the tensile reinforcement for the top end of the annular wall 27 that the use of a single, circular plate would, thereby providing effective resistance to the radially-oriented forces applied to the wall 27 by the rolling bearings.

Figure 3:
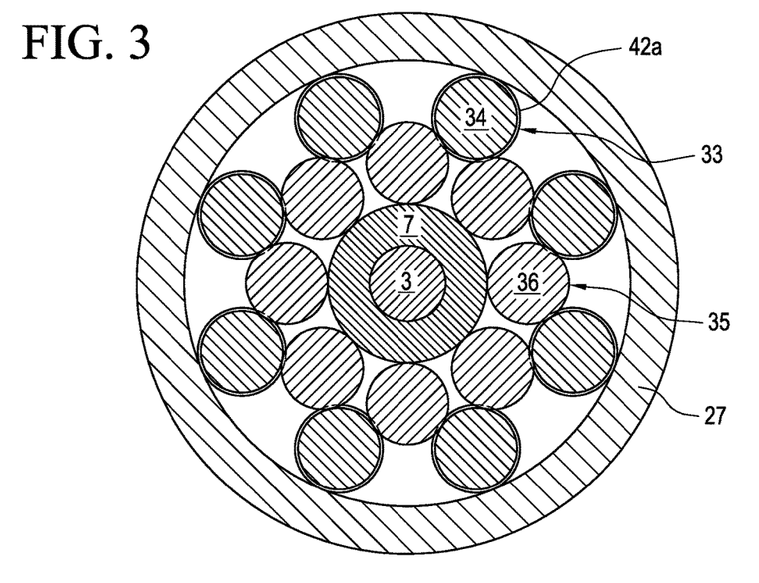
FIG. 3 is a top cross-sectional view of the cageless rolling bearing illustrated in FIGS. 1A and 1B.

With reference to FIGS. 1A, 1B, and 3A, the cageless rolling bearing 15 further includes an outer ring 33 of roller bearings 34 and an inner ring 35 of ball bearings 36. In the preferred embodiment, both the outer ring 33 and the inner ring may include between six and sixteen rolling bearings. The fewer bearings used in each ring 33, 35 the larger the diameter of the bearings 34, 36 and the less turnover wear and the less heat generated. On the other hand, the use of a larger number of bearings 34, 36 more evenly distributed the pressure exerted on the bearings 34, 36 during extreme side loading conditions that might occur for example during an earthquake. While the roller bearings 34 and the ball bearing 36 are uniform in size and shape in the several embodiments described in this section, the diameter of the roller bearings 34 may be somewhat larger than the diameter of the ball bearings 36 as is indicated in FIG. 3A. Preferably, each of the bearings 34, 36 is formed from an appropriate grade of steel, and may be chrome plated or otherwise treated for corrosion-resistance. Such bearings are well known in the art and many commercially-available roller and ball bearings are suitable for the implementation of the invention. As is seen best in FIG. 1B, each of the roller bearings 34 has an arcuate recess 40 that circumscribes its central portion and which is symmetrically disposed around its axis of rotation. The arcuate recess 40 of each of the roller bearings is complementary in shape to the circular profile of the ball bearings 36. The arcuate recess 40 of each roller bearing 34 is flanked by cylindrical, load-bearing surfaces 42a, 42b. The cylindrical, load-bearing surfaces 42a, 42b on the outer side of each roller bearing 34 engage the inner surface of the annular, load-bearing wall 27, while the inner side of each roller bearing 34 engages two of the ball bearings 36. Each of the ends of the roller bearings 34 terminates in a spherical section 44a, 44b so that the roller bearings make only point contact with the base plate 19 or top bearing cover in the event they are moved into contact with these components of the housing.

Figure 2A:
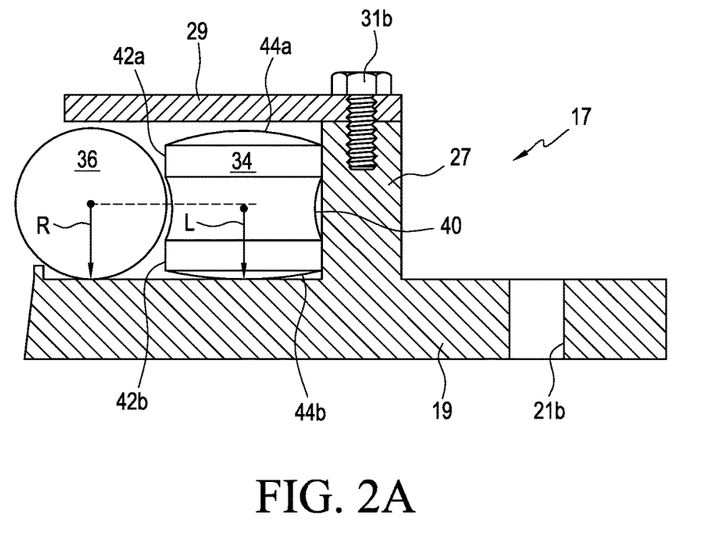
FIGS. 2A and 2B are enlarged side views of the rolling bearings shown in FIG. 1B, illustrating how wedging engagement between the ball bearings and the roller bearings by the cork-shaped sleeve member results in the lifting of the roller bearings off of the base plate of the rolling bearing housing.
Figure 2B:
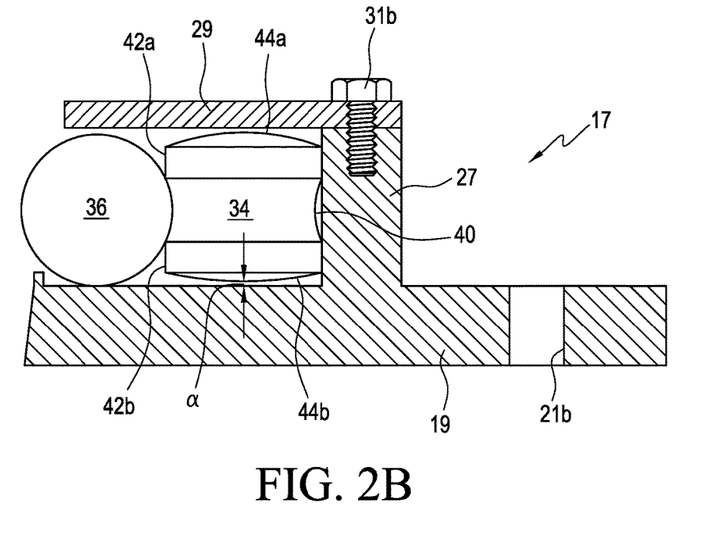

FIGS. 2A and 2B illustrate how the ball bearings 36 "lift" the roller bearings 34 out of contact with the base plate 19 of the housing 17 during the operation of the bearing assembly 1. As is shown in FIG. 2A, the radius "R" of the ball bearings 36 is longer than the length "L" of the roller bearings 34 along their axes of rotation from their midpoints to the tip end of their bottom spherical sections 44b. Accordingly, when the frustroconical surface 9 of the sleeve member 7 wedgingly engages the inner surfaces of the ball bearings 36 due the combination of its weight and the pressure applied to its top surface by the spring-loaded biasing mechanism 60, the engagement between the upper surface of the ball bearings 36 against the upper portion of the central, complementary-shaped recesses 40 of the roller bearings causes the ball bearings to lift the roller bearings a small distance "d" out of contact with the base plate 19 as shown in FIG. 2B. The height of the annular wall 27 is chosen such that this lifting action will not raise the top spherical sections 44a of the roller bearings 34 into contact with the bottom surface of the bearing cover 29. As a result, when the frustroconical surface 9 of the sleeve member 7 wedgingly engages the inner surfaces of the ball bearings 36, the only contact between the roller bearings 34 and the bearing housing 17 is the contact between the cylindrical, load-bearing surfaces 42a, 42b of the roller bearings 34 and the inner surface of the annular, load-bearing wall 27.

Figure 4A:
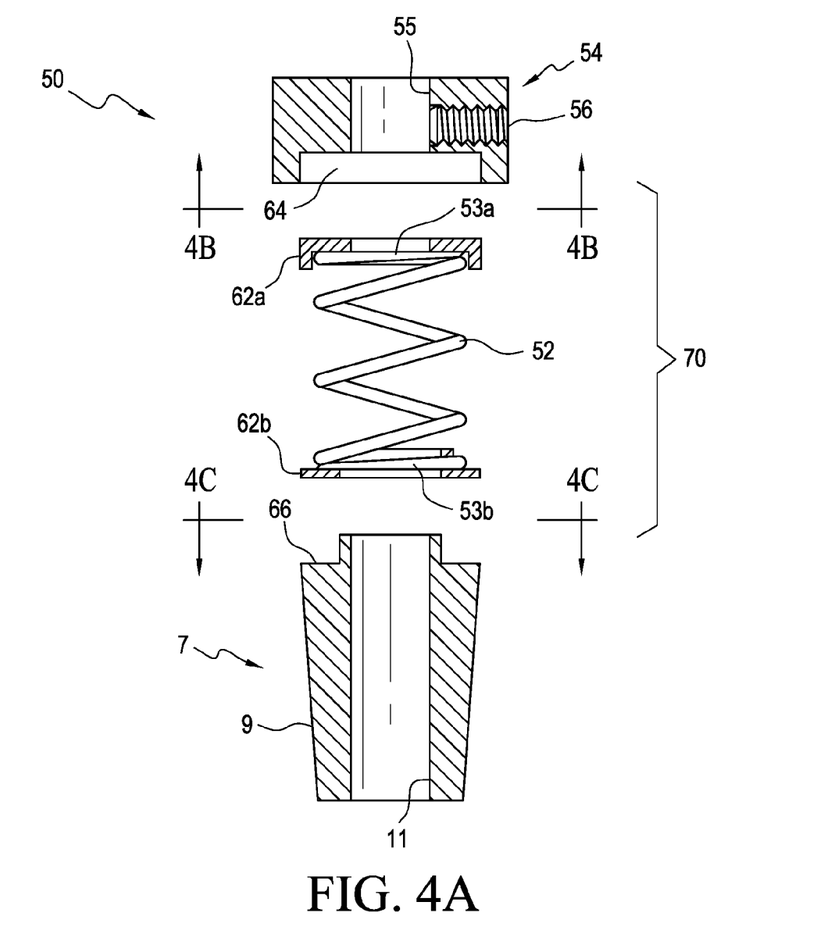
FIG. 4A side cross-sectional view of the biasing mechanism that spring-loads the sleeve member downwardly into the planetary bearing.
Figure 4B:
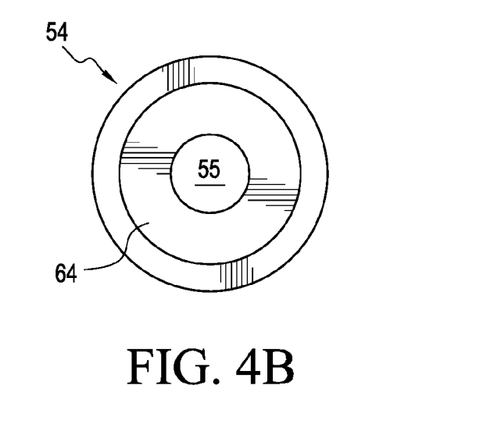
Figure 4C:
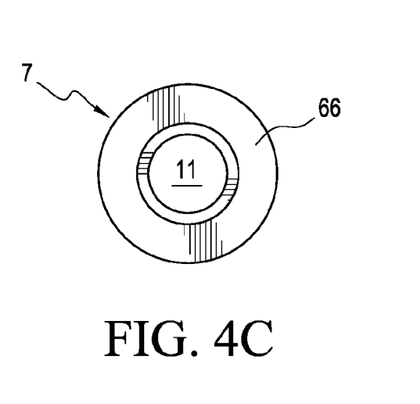

FIGS. 4A, 4B, and 4C illustrate the spring-loaded biasing mechanism 50 of the bearing assembly that insures that the sleeve member 7 wedgingly engages the inner ring 35 of ball bearings 36 of the planetary bearing 15 with a substantially constant force despite wear of the frustroconical outer surface 9 of the sleeve member 7 over time. To this end, the biasing mechanism 50 includes a compression coil spring 52 having an upper end 53a and a lower end 53b. The coil spring 52 circumscribes the rotating spindle 3 (as indicated in FIG. 1A) and is captured between a disc-shaped retainer 54 at its upper end 53a and the upper surface of the sleeve member 7 at its lower end 53b. The disc-shaped retainer 54 includes a concentrically-arranged bore 55 for admitting the rotating spindle and a set screw 56 for securing the retainer to the spindle 3. Set screw 56 also allows for the adjustment of the amount of compressive force the spring 52 applies to the tapered sleeve 7, which is axially slidable on the spindle 3. As previously mentioned, the angle θ of the taper of the sleeve member 7 is preferably between about 4° and 25°, and more preferably between about 5° and 9°. If the angle θ is less than about 4°, the inner ring 35 of ball bearings 36 may apply excessive compressive forces to the frustroconical surface 9 of the sleeve member 7 as a result of the wedging action between the sleeve member and the bearings 36. However, if the angle is more than 25°, a significant amount of the compressive reaction forces on the inner ring 35 of ball bearings 36 will be directed toward the base plate 19 of the housing 17, instead of toward the roller bearings 34, thereby increasing the friction within the planetary bearing 15.

The spring-loaded biasing mechanism 50 further includes a clutch 60 for selectively transmitting torque from the rotating spindle 3 to the sleeve member 7 so that the two rotate in unison during normal operating conditions. The clutch 60 includes an upper clutch ring 62a for receiving the upper end 53a of the coil spring, and a lower clutch ring 62b for receiving the lower end 53b of the coil spring. The upper and lower clutch rings 62a, 62b are preferably formed from bronze, and have L-shaped profiles complementary in shape to the disc-shaped recess 64 in the retainer 54, and the annular ledge 66 circumscribing the top of the sleeve member 7 respectively. Clutch rings 62a, 62b are non-rotatably mounted to the ends 53a, 53b of the coil spring 52. This may be accomplished by braising the spring ends 53a, 53b to the rings 62a, 62b or by providing interfitting protrusions and recesses between the spring ends 53a, 53b and the rings 62a, 62b. During normal operating conditions, spring-generated frictional forces at the interfaces between the bronze rings 62a, 62b and the steel surfaces of the retainer recess 64 and sleeve member ledge 66 transmits sufficient torque from the rotating spindle 3 to the sleeve member 7 that theses two components rotate in unison without slippage between the rings 62a, 62b and the steel surfaces of the recess 64 and ledge 66 that they engage. However, during abnormal operating conditions where the normally free-floating sleeve member 7 momentarily binds against the inner ring of ball bearings 36 of the planetary bearing assembly 15, the clutch coupling between the spindle 3 and the tapered sleeve can momentarily break, allowing the spindle 3 to rotate within the central bore 11 of the tapered sleeve 7 while one or the other or both of the clutch rings 62a, 62b rotatably slides over the surfaces of the steel surfaces of the retainer recess 64 and sleeve member ledge 66. Such a clutch disengagement action can advantageously avoid the snapping of the spindle 3 (and consequent catastrophic failure of the bearing assembly 1) that would otherwise occur if the spindle 3 and sleeve member 7 were non-rotatably connected to one another.

Figure 5A:
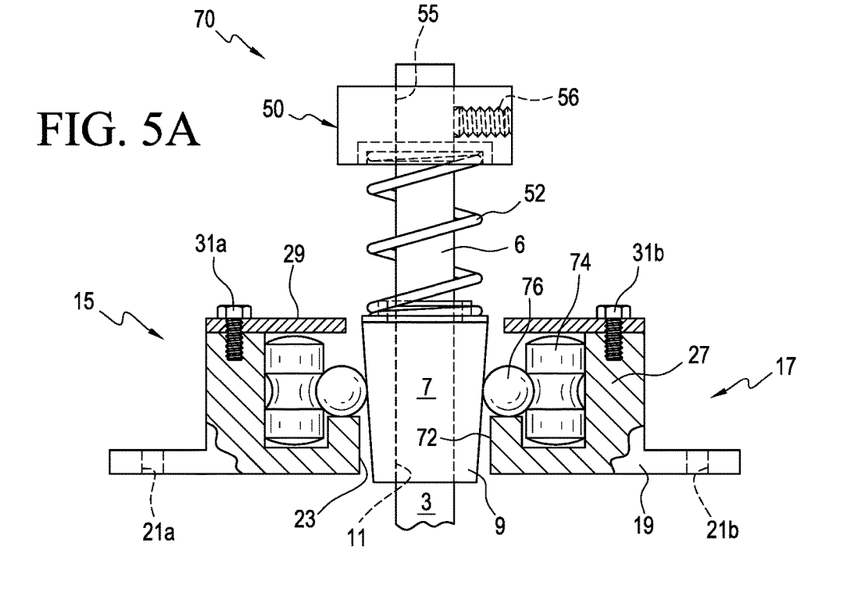
FIG. 5A is a side, partial cross-sectional view of a second embodiment of the side load bearing assembly of the invention.
Figure 5B:
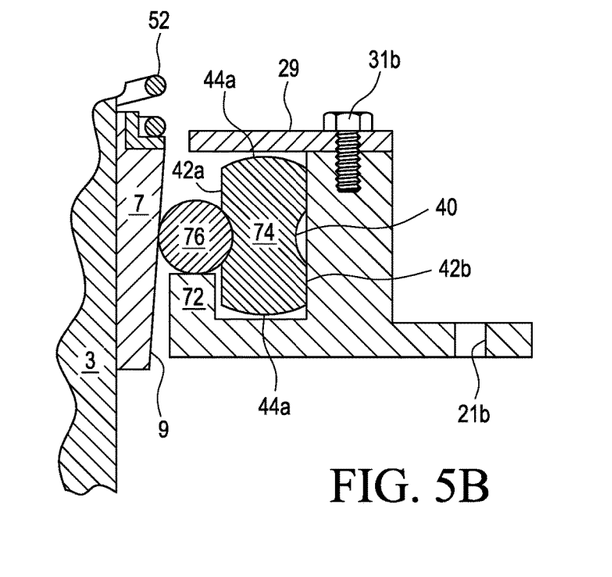
FIG. 5B is an enlarged, partial side-cross sectional view of the side load bearing assembly of FIG. 5A, illustrating in particular a bearing support wall that raises the outer ring of ball bearings up from the surface of the housing base plate.

FIGS. 5A and 5B illustrate an alternative embodiment 70 of the side load bearing assembly. In this embodiment, the circular base plate 19 of housing 17 includes an annular bearing support wall 72 for raising the level of the ball bearings 76. The raising of the ball bearings allows the diameter of the ball bearings 76 to be made smaller relative to the length of the roller bearings 74 while still allowing the ball bearings 76 to lift the roller bearings 74 out of contact with the base plate 19 when they are pushed into engagement against the arcuate recesses 40 of the roller bearings 74. The raising of the ball bearings 76 allows the roller bearings 74 to be made longer, which in turn allows the cylindrical, load-bearing surfaces 42a, 42b of the roller bearings 74 to be made longer such that their area is relatively greater relative to the roller bearings 34 of the first embodiment 1. Because the ball bearings 76 can be made smaller, more such bearings can be used, which in turn will distribute any side loads applied to the spindle over a greater number of pressure points. Moreover, the longer length and greater area of the cylindrical, load-bearing surfaces 42a, 42b of the roller bearings 74 will allow such side load forces to be distributed over a greater area at the interface between the roller bearings and the annular wall 27. These features make the second embodiment 70 better able to absorb large side loads applied by the spindle 3 to the planetary bearing 15.

Figure 6:
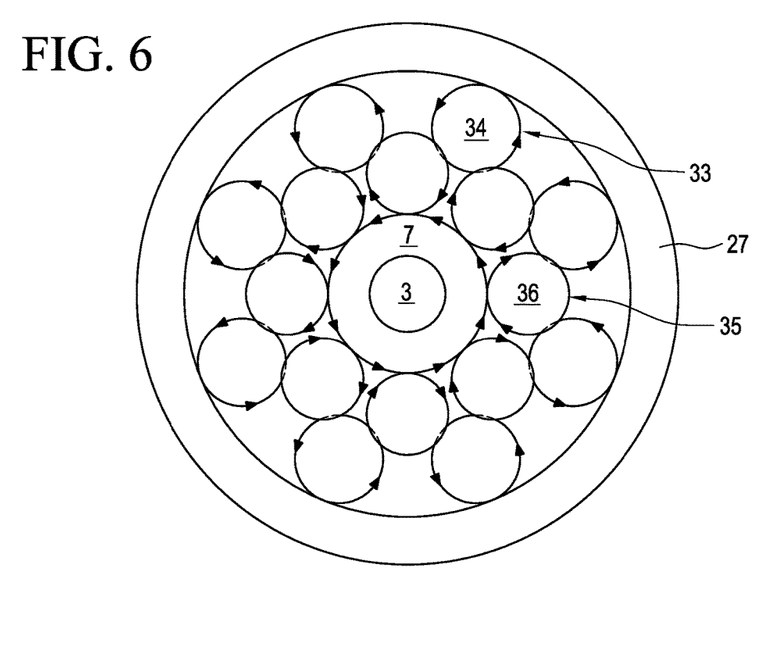
FIG. 6 is a schematic diagram of the planetary bearing shown in FIG. 3 illustrating how the bearings rotate relative to each other and the sleeve member during the normal operation of the bearing.

FIG. 6 illustrates the manner in which the roller bearings 34 and ball bearings 36 rotate during the normal operation of the side-load bearing assembly 1. As the sleeve member 7 rotates counterclockwise along with the spindle 3, the frictional forces generated by the engagement of the outer surface 9 of the sleeve member 7 against the inner ring of ball bearings 36 causes each of the ball bearings 36 to rotate clockwise as shown. Frictional engagement between the ball bearings 36 and the roller bearings 34 causes each of the roller bearings 34 to rotate counterclockwise as shown. Such rotation of the bearings advantageously allows a film of lubricant to be continuously applied over the working surfaces of the rolling bearings 34, 36 during operation. None of the rolling bearings 34, 36 comes into contact with any counter-rotating bearing, thereby avoiding potential problems caused by "shoot and scoot". Moreover, while FIG. 6 would seem to indicate that the ball bearings 36 rotate around a fixed vertical axis, they in fact undergo some amount of precession while they rotate due to friction from the circular base plate 19. Such bearing precession advantageously distributes surface wear across the entire spherical surface of these bearings 36. While the schematic bearing rotation diagram of FIG. 6 has been discussed only with respect to the bearings 34, 36 of the first embodiment 1 of the invention illustrated in FIGS. 1A and 1B, this discussion applies equally to the bearings 74, 76 of the second embodiment 50 illustrated in FIGS. 5A and 5B.

Figure 7:
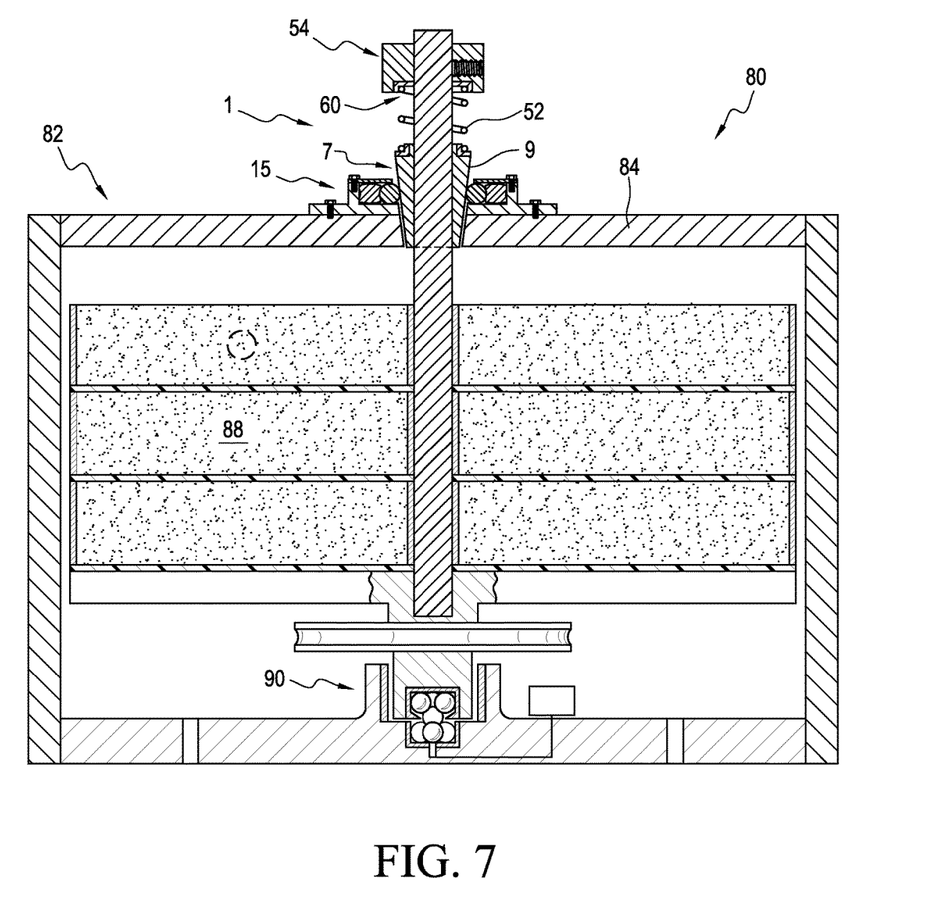
FIG. 7 illustrates how the side load bearing of the invention may advantageously be configured as an upper bearing assembly in a high-mass energy-storing flywheel.

FIG. 7 illustrates the application of the side load bearing assembly 1 to a flywheel assembly 80 having a housing 82, where the housing 82 serves as an example of a support member for the side load bearing assembly 1 . Here, the bearing assembly 1 is mounted on the upper wall 84 of the housing 82 over an opening 86 that admits a vertically-oriented rotating spindle 3. The spindle is in turn connected to a massive flywheel 88. A thrust bearing 90 rotatably supports the spindle 3 and flywheel 88 with a minimum amount of friction, as described in U.S. Pat. No. 8,978,513.

Under normal operating conditions, with the spindle 3 being precisely vertically oriented and with the flywheel 88 being balanced to within commercially practical tolerances, the cork-shaped sleeve member 3 rotates in unison with the spindle 3, and uniformly engages the inner ring 35 of ball bearings 36 within the cageless, planetary bearing 15 with little or no unbalancing side load forces. The wedging engagement applied by the frustroconical outer surface 9 of the sleeve member 7 to the inner ring 35 of ball bearings 36 remains constant as the coil spring 52 of the biasing mechanism 50 immediately slides the sleeve member 7 down the spindle 3 as material from the frustroconical surface 9 wears away. In the event of an earthquake or the unbalancing of the flywheel 88 due to a portion breaking off, the resulting severe side loading forces are accommodated by the previously-described clutch 60 of the biasing mechanism 50, which allows the spindle 3 to rotate within the central bore 11 of the sleeve member 7 in the event that binding occurs between the frustroconical outer surface 9 of the sleeve member 7 and the inner ring 35 of ball bearings 36.

The use of an axially-slidable sleeve member 7 over the spindle 3 of the bearing assembly has a number of advantages. For example, sleeve member 7 reinforces the spindle 3 from being deformed or cut at the contact points with the inner ring 35 of ball bearings 36. This is because the sleeve member 7 expands the area where the inner ring 35 of ball bearings 36 applies forces to the spindle 3. In addition for compensating for wear, the combination of the sleeve member 7 and the biasing mechanism 50 compensates of thermal expansion at the interface between the inner ring 35 of ball bearings 36 and the sleeve member 7 and spindle 3. The cageless design of the rolling bearing 15 reduces friction and the opportunities for failure in the event of extreme side loading forces. The side load bearing assembly 1 can be scaled to meet any working size and/or speed of rotation.

The invention has been described in detail with particular reference to certain preferred embodiments thereof, but it will be understood that variations and modifications can be effected within the spirit and scope of the invention. For example, while the cageless rolling bearing assembly 15 surrounding the sleeve member 7 has been described in terms of a planetary bearing in the several examples, the outer and inner rings of rolling bearings 33, 35 need not operate in a planetary fashion. Alternatively, the inner ring 35 could be comprised of relatively larger ball bearings that engage both the outer surface 9 of the sleeve member 7 and the load-bearing annular wall 27 of the housing 17 on their opposite sides, while the sub outer ring 33 of rolling bearings could comprise ball bearings of a relatively smaller diameter interspersed between the larger ball bearings forming the sub inner ring 35, which is also limited by load-bearing annular wall 27 of the housing 17. Here, the relatively smaller-diametered ball bearings of the outer ring 33 would not bear any load from the sleeve member 7, and would function only as rolling spacers between the ball bearings of the inner ring 35. Such a variation of the cageless rolling bearing 15 would be substantially less expensive to fabricate while imposing only very small increases in friction.

While the embodiments of the invention have been described with respect to a vertically-oriented spindle wherein little or no side loading would be applied to the bearing assembly during normal operating conditions, the bearing assembly 1 may also be used in conjunction with a non-vertically oriented spindle, and in particular a horizontally-oriented spindle where a side load is constantly applied to the bearing assembly during ordinary operating conditions. Other variations and modifications of the invention will become evident to persons skilled in the art. All such modifications, variations, and additions to the invention are intended to be encompassed by this patent, which is limited only by the claim definitions of the invention and their equivalents.

The invention claimed is:
1. A side load bearing assembly, comprising:
a sleeve member mounted on a spindle and having a frustroconical outer surface, and
a cageless rolling bearing circumscribing the sleeve member, including a housing having a load-bearing annular wall, and an outer ring and an inner ring of rolling bearings that engage the load-bearing annular wall and the frustroconical outer surface of the sleeve member, respectively, the outer ring of rolling bearings maintaining an angular spacing between the inner ring of rolling bearings,
wherein the frustroconical outer surface of the sleeve member wedgingly engages the inner ring of rolling bearings, and
wherein the sleeve member is slidably moveable along an axis of rotation of the spindle.
2. The side load bearing assembly defined in claim 1, wherein the cageless rolling bearing circumscribing the sleeve member is a planetary bearing wherein the outer ring of rolling bearings engages the load-bearing annular wall of the housing, and wherein each of the inner ring of rolling bearings engages two of the outer ring bearings on one side, and the frustroconical outer surface of the sleeve member on another side.
3. The side load bearing assembly defined in claim 2, further comprising a biasing mechanism for biasing the sleeve member along the axis of rotation of the spindle such that the frustroconical outer surface wedgingly engages the inner ring of rolling bearings at a same pressure regardless of wear or deformation of the frustroconical outer surface of the sleeve member.
4. The side load bearing assembly defined in claim 3, wherein the biasing mechanism includes a resilient member and a clutch for transmitting torque from the spindle to the tapered sleeve.
5. The side load bearing assembly defined in claim 4, wherein the resilient member is compressed between the sleeve member and a retainer connected to the spindle, and wherein the clutch includes one or more friction members disposed between the resilient member, and one or the other or both of the sleeve member and the retainer.
6. The side load bearing assembly defined in claim 1, wherein the rolling bearings of the inner ring are ball bearings.
7. The side load bearing assembly defined in claim 6, wherein the rolling bearings of the outer ring are cylindrical roller bearings.
8. The side load bearing assembly defined in claim 7, wherein the cylindrical roller bearings of the outer ring are arcuately recessed around their axes of rotation to provide line contact between the cylindrical roller bearings of the outer ring and the ball bearings of the inner ring.
9. The side load bearing assembly defined in claim 8, wherein the diameter of the ball bearings and the arcuate recess of the roller bearings are configured such that a bottom surface of each of the roller bearings is lifted out of contact with the housing of the cageless planetary bearing when the ball bearings forcefully engage the roller bearings.

10. A side load bearing assembly, comprising:
a sleeve member slidably mounted on a spindle and having a frustroconical outer surface concentrically arranged around an axis of rotation of the spindle;
  a cageless planetary bearing circumscribing the sleeve member, including a housing having a load-bearing annular wall, an outer ring of rolling bearings that engage the load-bearing annular wall, and an inner ring of rolling bearings, each of which engages two of the outer ring bearings on one side, and the frustroconical outer surface of the sleeve member on another side, and
  a biasing mechanism for biasing the sleeve member along the axis of rotation of the spindle such that the frustroconical outer surface wedgingly engages the inner ring of rolling bearings at a same pressure regardless of wear or deformation of the frustroconical outer surface of the sleeve member.

11. The side load bearing assembly defined in claim 10, wherein the biasing mechanism includes a resilient spring member.

12. The side load bearing assembly defined in claim 11, wherein the biasing mechanism further includes a clutch for transmitting torque from the spindle to the sleeve member through the resilient spring member.

13. The side load bearing assembly defined in claim 12, wherein the resilient spring member is compressed between the sleeve member and a retainer connected to the spindle, and wherein the clutch includes one or more friction members disposed between the resilient member, and one or the other or both of the sleeve member and the retainer which frictionally transmit torque from the spindle to the sleeve member.

14. The side load bearing assembly defined in claim 10, wherein the spindle is vertically oriented, and further comprising a support member for supporting the housing of the planetary bearing around the spindle.

15. The side load bearing assembly defined in claim 10, wherein the rolling bearings of the inner ring are ball bearings having a uniform diameter.

16. The side load bearing assembly defined in claim 15, wherein the rolling bearings of the outer ring are cylindrical roller bearings having a uniform axial length.

17. The side load bearing assembly defined in claim 16, wherein the cylindrical roller bearings of the outer ring are arcuately recessed around their axes of rotation to provide line contact between the cylindrical roller bearings of the outer ring and the ball bearings of the inner ring, and
wherein the diameter of the ball bearings and the arcuate recess of the cylindrical roller bearings are configured such that a bottom surface of each of the cylindrical roller bearings is lifted out of contact with the housing of the cageless planetary bearing when the ball bearings forcefully engage the cylindrical roller bearings.

18. The side load bearing assembly defined in claim 16, wherein the cylindrical roller bearings of the outer ring include an arcuate bottom surface to provide point contact between the cylindrical roller bearings and the housing of the bearing assembly.

19. A side load bearing assembly, comprising:
a sleeve member slidably and rotationally mounted on a vertically-oriented spindle, the sleeve member having a frustroconical outer surface concentrically arranged around an axis of rotation of the spindle;
  a cageless planetary bearing circumscribing the sleeve member, including a housing having a load-bearing annular wall, an outer ring of cylindrical roller bearings that engage the load-bearing annular wall, and an inner ring of ball bearings, each of which engages two of the outer cylindrical roller bearings on one side, and the frustroconical outer surface of the sleeve member on another side,
  a support member for supporting the housing of the planetary bearing around the spindle, and
  a biasing mechanism for biasing the sleeve member along the axis of rotation of the spindle such that the frustroconical outer surface wedgingly engages the inner ring of rolling bearings at a same pressure regardless of wear or deformation of the frustroconical outer surface of the sleeve member, including
    a resilient spring member compressed between the sleeve member at one end and a retainer connected to the spindle at an opposite end, and
    a clutch that frictionally transmits torque from the spindle to the sleeve member via friction, including one or more friction members disposed between the resilient spring member and one or the other or both of the sleeve member and the retainer.

20. A side load bearing assembly, comprising:
a sleeve member mounted on a spindle and having a frustroconical outer surface, and
a cageless rolling bearing circumscribing the sleeve member, including a housing having a load-bearing annular wall, and an outer ring and an inner ring of rolling bearings that engage the load-bearing annular wall and the frustroconical outer surface of the sleeve member, respectively, the outer ring of rolling bearings maintaining an angular spacing between the inner ring of rolling bearings,
wherein the frustroconical outer surface of the sleeve member wedgingly engages the inner ring of rolling bearings,
wherein the cageless rolling bearing circumscribing the sleeve member is a planetary bearing wherein the outer ring of rolling bearings engages the load-bearing annular wall of the housing, and wherein each of the inner ring of rolling bearings engages two of the outer ring bearings on one side, and the frustroconical outer surface of the sleeve member on another side, and
further comprising a biasing mechanism for biasing the sleeve member along an axis of rotation of the spindle such that the frustroconical outer surface wedgingly engages the inner ring of rolling bearings at a same pressure regardless of wear or deformation of the frustroconical outer surface of the sleeve member.

21. A side load bearing assembly, comprising:
a sleeve member mounted on a spindle and having a frustroconical outer surface, and
a cageless rolling bearing circumscribing the sleeve member, including a housing having a load-bearing annular wall, and an outer ring and an inner ring of rolling bearings that engage the load-bearing annular wall and the frustroconical outer surface of the sleeve member, respectively, the outer ring of rolling bearings maintaining an angular spacing between the inner ring of rolling bearings, and
a biasing mechanism that biases the frustroconical outer surface of the sleeve member in engagement with the inner ring of rolling bearings.

* * * * *